US011678212B2

(12) United States Patent
Zhao et al.

(10) Patent No.: US 11,678,212 B2
(45) Date of Patent: Jun. 13, 2023

(54) METHODS EXECUTED BY USER EQUIPMENT AND USER EQUIPMENT

(71) Applicants: SHARP KABUSHIKI KAISHA, Sakai (JP); FG Innovation Company Limited, Tuen Mun (HK)

(72) Inventors: Yinan Zhao, Shanghai (CN); Renmao Liu, Shanghai (CN); Shohei Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/280,432

(22) PCT Filed: Sep. 26, 2019

(86) PCT No.: PCT/CN2019/108157
§ 371 (c)(1),
(2) Date: Mar. 26, 2021

(87) PCT Pub. No.: WO2020/063747
PCT Pub. Date: Apr. 2, 2020

(65) Prior Publication Data
US 2021/0385842 A1   Dec. 9, 2021

(30) Foreign Application Priority Data

Sep. 28, 2018   (CN) .......................... 201811145154.4

(51) Int. Cl.
*H04W 24/10*   (2009.01)
*H04L 5/00*   (2006.01)
(Continued)

(52) U.S. Cl.
CPC .......... *H04W 24/10* (2013.01); *H04L 5/0051* (2013.01); *H04L 5/0053* (2013.01);
(Continued)

(58) Field of Classification Search
CPC .......... H04W 72/1278; H04W 72/048; H04W 72/1231; H04W 24/10; H04W 72/042; H04L 5/0051; H04L 5/0053
See application file for complete search history.

(56) References Cited

U.S. PATENT DOCUMENTS

2015/0358981 A1   12/2015   Chae et al.
2018/0213379 A1*  7/2018   Xiong .................... H04W 4/70
(Continued)

FOREIGN PATENT DOCUMENTS

CN   102082636     6/2011
CN   102082636 A   6/2011
(Continued)

OTHER PUBLICATIONS

Hua Wei et al. "Discussion on Delay and Interruption Requirements for V2X CA in Mode 3" 3GPP TSG-RAN WG4 Meeting #86bis R4-1804796, Apr. 20, 2018 (Apr. 20, 2018), entire document.
(Continued)

*Primary Examiner* — Kevin C. Harper
(74) *Attorney, Agent, or Firm* — ScienBiziP, P.C.

(57) ABSTRACT

A method performed by a sidelink transmitting user equipment (SL TX UE) for sidelink (SL) vehicle to everything (V2X) unicast transmission to a sidelink receiving user equipment (SL RX UE). The method includes: receiving, a Radio Resource Control (RRC) configuration from a base station, the RRC configuration includes at least information for enabling SL Channel State Information (CSI) reporting
(Continued)

and first Modulation and Coding Scheme (MCS) information for SL transmission by the SL TX UE; transmitting, a CSI-Reference Signal (CSI-RS) measurement resource configuration to the SL RX UE for deriving an SL CSI report; transmitting, an aperiodic CSI report trigger to the SL RX UE for triggering the SL CSI report in a sidelink control information (SCI); and receiving, the SL CSI report from the SL RX UE in a Physical Sidelink Shared Channel (PSSCH).

3 Claims, 5 Drawing Sheets

(51) Int. Cl.
*H04W 72/04* (2009.01)
*H04W 72/12* (2009.01)

(52) U.S. Cl.
CPC ........ *H04W 72/042* (2013.01); *H04W 72/048* (2013.01); *H04W 72/1231* (2013.01); *H04W 72/1278* (2013.01)

(56) References Cited

U.S. PATENT DOCUMENTS

| | | | |
|---|---|---|---|
| 2019/0174530 A1 | 6/2019 | Kim et al. | |
| 2020/0022089 A1* | 1/2020 | Guo | H04W 52/383 |
| 2021/0219268 A1* | 7/2021 | Li | H04L 1/08 |
| 2021/0306824 A1* | 9/2021 | Li | H04W 72/1263 |
| 2022/0007403 A1* | 1/2022 | Li | H04W 72/1289 |

FOREIGN PATENT DOCUMENTS

| | | |
|---|---|---|
| CN | 105246025 A | 1/2016 |
| CN | 108141340 A | 6/2018 |
| EP | 3242515 | 11/2017 |
| WO | 2017173133 | 10/2017 |
| WO | 2017173133 A | 10/2017 |
| WO | 2018004323 | 1/2018 |

OTHER PUBLICATIONS

Vodafone, "New SID: Study on NR V2X", RP-181429, 3GPP TSG RAN Meeting #80, La Jolla, USA, Jun. 11-14, 2018.

* cited by examiner

METHODS EXECUTED BY USER EQUIPMENT AND USER EQUIPMENT

CROSS-REFERENCE TO RELATED APPLICATION(S)

This application is a national stage application of International Patent Application PCT/CN2019/108157, filed Sep. 26, 2019, now published as WO2020/063747. International Patent Application PCT/CN2019/108157 claims the benefit of CN Patent Application 201811145154.4, filed Sep. 28, 2018. CN Patent Application 201811145154.4 and International Patent Application PCT/CN2019/108157, now published as WO2020/063747, are incorporated herein by reference.

FIELD

The present disclosure generally relates to wireless communications, and specifically, to methods executed by user equipment, methods executed by base station and the corresponding user equipment.

BACKGROUND

In June 2015, at the 3rd Generation Partnership Project (3GPP) RAN #68 plenary meeting, a V2X feasibility study project based on cellular network technology was approved. V2X represents 'Vehicle to everything,' which aims to realize the interactions between a vehicle and all physical entities that may affect the vehicle, and to reduce accidents, relieve traffic congestion, reduce environmental pollution and provide other information-related services. V2X mainly includes 4 aspects: 1. V2V, Vehicle-to-Vehicle, that is, vehicle to vehicle communications; 2. V2P, Vehicle-to-Pedestrian, that is, vehicles sending warnings to pedestrians or non-motor vehicles; 3. V2N, Vehicle-to-Network, that is, vehicles connecting to mobile network; 4. V2I, Vehicle-to-Infrastructure, that is, communications between vehicles and roads or infrastructures of the like.

3GPP separates the V2X research and standardization work into 3 stages. The first phase was completed in September 2016, mainly focusing on V2V, based on LTE Release 12 and Release 13 D2D (Device to Device, direct communications between devices, may also be referred to as sidelink), that is, the specification of adjacent communications technology. V2X Stage 1 introduces a new D2D communications interface, referred to as PC5 interface. The PC5 interface is mainly used to address the communications problems of cellular vehicle networks in high speed (up to 250 km/h) and high node density environments. Vehicles may interact with information such as position, speed, and direction via the PC5 interface, that is, vehicles may communicate directly through the PC5 interface. The second phase of V2X belongs to the LTE Release15 research category. The main features introduced include higher order 64QAM modulation, V2X carrier aggregation, short TTI, and a feasibility study of transmit diversity. At the 3GPP RAN #80 plenary meeting in June 2018, the corresponding third phase V2X feasibility study project based on 5G NR network technology (see Non-Patent Literature 1) was approved.

The NR V2X project includes design goals to support unicast, multicast, and broadcast. Unicast refers to the communications between a transmitting user equipment (UE) and a single receiving user equipment. Multicast generally represents a group of UEs that are assigned the same identifier (ID), and the UEs communicate within the group. Broadcast is widely used in scenarios such as base stations transmitting system messages to UEs in a cell in cellular communications. In Long Term Evolution (LTE) and New Radio (NR) communications, a base station and UE in communications use a form of unicast. Using the downlink data communication as an example, the data channel (e.g., a PDSCH) uses the UE specific Cell Radio Network Temporary Identifier (C-RNTI) to perform scrambling, and thereby, realizes unicast communication at the physical layer. It is noted that, in order to better reflect the quality of the downlink channel and improve transmission reliability, unicast communications usually includes Channel State Indicator (CSI) reporting and Hybrid Automatic Repeat Request (HARQ) retransmission mechanisms. Release 14/15 LTE V2X project currently only supports broadcast communications between UEs, that is, control information and data sent by one UE can be received by other multiple UEs and decoded correctly. For NR V2X, in order to enable unicast communications, as described above, the CSI reporting mechanism and HARQ retransmission mechanism in V2X need to be specifically designed.

Wireless channel conditions are constantly changing. In LTE and NR communications, in order to better adapt to changes in wireless channels, the UE can report downlink channel quality information to the base station via CSI, so that the base station can select a more reliable Modulation and Coding Scheme (MCS) for the UE, and more accurate time-frequency resources. CSI represents channel state information, and is composed of Channel Quality Indicator (CQI), Precoding Matrix Indicator (PMI), and Rank Indicator (RI). The present disclosure does not specifically limit the contents included in the CSI, and uses CSI reporting as a common representation. In NR, the base station configures CSI-Reference Signal (RS) (CSI-RS) resources at the UE level via Radio Resource Control (RRC) signaling. The base station dynamically triggers whether the UE reports non-periodic CSI in the uplink scheduling grant sent to the UE. The UE acquires CSI information by measuring the received downlink reference signal (CRS in LTE and CSI-RS in NR), and reports the CSI to the base station based on the resources indicated by the base station. For periodic CSI reporting, the base station configures Physical Uplink Control Channel (PUCCH) resources for the UE for CSI reporting; for non-periodic CSI reporting, the base station instructs the UE to use the Physical Uplink Shared Channel (PUSCH) resources for reporting CSI. Specifically, in 5G NR non-periodic CSI reporting, the base station indicates the non-periodic CSI reporting type triggered by the UE via the CSI request field in the uplink scheduling grant, and instructs the UE the available resources for reporting CSI via a beta offset indicator field and an Uplink Shared Channel (UL-SCH) indicator field. The base station takes into consideration the channel quality reported by the UE when performing downlink scheduling. HARQ represents hybrid automatic retransmission, which can provide error correction function and realize rapid retransmission. This is widely used in wireless data communications, which will not be repeated here.

FIG. 1 is a schematic diagram illustrating a basic process of LTE V2X direct communication in the present 3GPP standard specification. FIG. 1 shows the basic process of LTE V2X direct communications. UE1 transmits control information (e.g., Sidelink Control Information (SCI) format 1) to UE2, which is carried by the physical layer channel (e.g., a PSCCH). SCI format 1 includes scheduling information for the Physical Sidelink Shared Channel (PSSCH), for example, time domain and frequency domain resources, Modulation and Coding Scheme (MCS), etc. Wherein, the PSSCH carries data (sidelink data) transmitted by UE1 to UE2 in FIG. 1.

1) The PSCCH occupies one subframe in the time domain and two consecutive Physical Resource Blocks (PRBs) in the frequency domain. The initialization process of the scrambling sequence uses a predetermined value 510. The PSCCH may carry SCI format 1, including at least PSSCH time-frequency domain resource information, such as the frequency domain resource indicator field, indicating the starting sub-channel number and the number of consecutive sub-channels corresponding to the PSSCH of the PSCCH.

2) The PSSCH also occupies one subframe in the time domain, and is in the same subframe as the corresponding PSCCH frequency division multiplexing (FDM). The PSSCH is in the form of a sub-channel in the frequency domain. The sub-channel is $n_{subCHsize}$ consecutive XPRBs in the frequency domain. The $n_{subCHsize}$ is configured by RRC parameters. The number of sub-channels is indicated by the frequency domain resource indicator field of SCI format 1.

FIG. 2 is a diagram schematically illustrating a resource allocation scheme of LTE V2X in the present 3GPP standard specification. FIG. 2 shows a resource allocation scheme of LTE V2X. LTE V2X includes two resource allocation schemes, which are respectively called resource allocation based on base station scheduling (Transmission mode 3) and resource allocation based on UE sensing (Transmission mode 4). In LTE V2X, when evolved NodeB (eNB) network coverage exists, the base station can configure the resource allocation schemes of the UE, or referred to as the transmission mode of the UE, via the UE level RRC signaling SL-V2X-ConfigDedicated.

1) Resource allocation based on base station scheduling: When scheduled-r14 is configured in SL-V2X-ConfigDedicated, it represents that the UE is configured as a transmission mode based on base station scheduling. The base station configures Sidelink V2X Radio Network Temporary Identifier (SL-V-RNTI) via RRC, and transmits an uplink scheduling grant (UL grant) to the UE via PDCCH (Downlink Control Information (DCI) format 5A). The above-disclosed uplink scheduling grant includes at least information such as a frequency domain resource indication of the PSSCH. After the UE successfully monitors the Physical Downlink Control Channel (PDCCH) scrambled by the SL-V-RNTI, the UE uses the PSSCH frequency domain resource indication field in the uplink scheduling grant as the frequency domain resource scheduling information of the PSSCH in the SCI format 1.

2) Resource allocation based on UE sensing: When ue-Selected-r14 is configured in SL-V2X-ConfigDedicated, it represents that the UE is configured as a transmission mode based on UE sensing. In the above-disclosed transmission mode, the base station configures an available transmission resource pool, and the UE determines the transmission resources of the PSCCH and PSSCH in the transmission resource pool according to predetermined rules (such as Reference Signal Receiving Power (RSRP), etc.), and transmits the PSCCH and PSSCH according to the process shown in FIG. 1. The present disclosure will not repeat the rules for determining available resources by the UE.

PRIOR ART DOCUMENTS

Non-Patent Literature

Non-Patent Literature 1 RP-181480' New SID Proposal Study on NR V2X.

SUMMARY

To address at least a part of the above problems, the present disclosure provides a method executed by a user equipment and a user equipment, which is a method and a user equipment that may be executed by a user equipment based on V2X of a 5G NR network technology.

According to a first aspect of implementations of the present disclosure, there is provided a method executed by a user equipment, the user equipment being a transmitting user equipment, the method comprising: acquiring configuration information of a base station, wherein the configuration information includes indication information of a transmission mode of the transmitting user equipment, and/or an indication of a CSI-RS measurement resource set, and/or an identifier of CSI report.

According to the method of the first aspect of implementations of the present disclosure, the method further comprises: transmitting a PSCCH including control information, the control information includes an identifier of CSI report or an indication of a transmission mode of the user equipment, and/or an indication of a CSI report trigger, and/or an indication of a CSI report resource, and/or an indication of a CSI-RS measurement resource.

According to the method of the first aspect of implementations of the present disclosure, the identifier of CSI report includes reporting the CSI to the base station or reporting the CSI to the user equipment.

According to the method of the first aspect of implementations of the present disclosure, the transmission mode configuration includes a transmission mode based on base station scheduling, or a transmission mode based on UE sensing, or a transmission mode based on base station assisted scheduling, or a transmission mode based on UE assisted scheduling.

According to a second aspect of implementations of the present disclosure, there is provided a method executed by a user equipment, the user equipment being a receiving user equipment, the method comprising: acquiring CSI measurement configuration information of a base station, where the CSI measurement configuration information includes a list of CSI report identifiers, and/or a resource set reported by CSI, wherein the list of CSI report identifiers includes one or more CSI report identifiers.

According to the method of the second aspect of implementations of the present disclosure, the method further comprises: using the first CSI report resource or the second CSI report resource for CSI reporting according to the CSI measurement configuration information.

According to the method of the second aspect of implementations of the present disclosure, the first CSI report resource and the second CSI report resource are indicated by the base station, or indicated by a PSCCH transmitted by a transmitting user equipment.

According to the method of the second aspect of implementations of the present disclosure, the CSI reported by the user equipment includes an ID of the user equipment, and/or an ID of a transmitting user equipment, and/or an ID of the direct communication connection between the user equipment and the transmitting user equipment.

According to a third aspect of implementations of the present disclosure, there is provided a method executed by a user equipment, the user equipment being a transmitting user equipment, the method comprising: acquiring configuration information of a base station, the configuration information includes whether to report a received CSI report; and if the acquired instruction indicates to report the received CSI report to the base station, using the resource indicated by the base station to report the CSI.

According to a fourth aspect of implementations of the present disclosure, there is provided a method executed by a user equipment, the user equipment being a transmitting user equipment, the method comprising: acquiring configuration information of a base station, the configuration information includes an indication of a transmission mode of the user equipment; and if the transmission mode of the user equipment included in the configuration information is a transmission mode scheduled by a base station or a transmission mode based on a base station assisted scheduling, reporting the received CSI report to the base station.

According to a fifth aspect of implementations of the present disclosure, there is provided a user equipment, comprising: a processor; and a memory storing instructions; wherein the instructions when executed by the processor executes the method executed by a user equipment according to any one of the first to fourth aspects.

BRIEF DESCRIPTION OF THE DRAWINGS

Aspects of the present disclosure are best understood from the following detailed description when read with the accompanying figures.

DESCRIPTION

Figure 1:
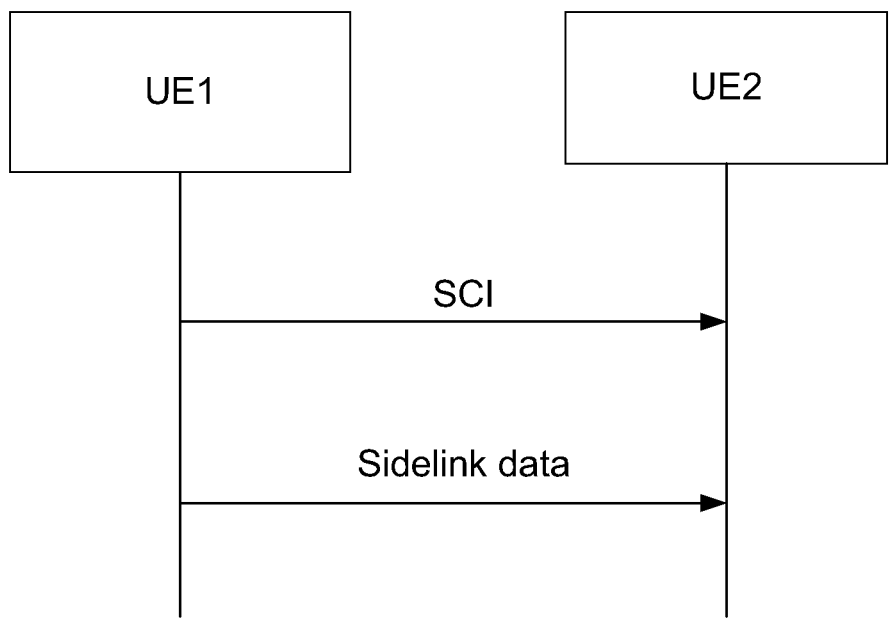
FIG. 1 is a schematic diagram illustrating a basic process of LTE V2X direct communication in the present 3GPP standard specification.

The following descriptions and accompanying drawings contain detailed descriptions of exemplary implementations of the present disclosure. It should be appreciated that the present disclosure is not limited to the implementations disclosed herein. Additionally, for the ease of understanding, the descriptions do not include detailed descriptions of general knowledge not directly related to the present disclosure in order to avoid confusion of the present disclosure.

The following uses the 5G mobile communications system and its subsequent evolved versions as exemplary application environment to describe the various implementations in detail according to the present disclosure. However, it is noted that the present disclosure is not limited to the following implementations, but may be suitable to other wireless communications systems, for example, the communications system after 5G and the 4G mobile communications system before 5G.

The terms related to the present disclosure are described below. Unless otherwise specified, the terms related to the present disclosure are herein defined. The terms given in the present disclosure may adopt different naming conventions in LTE, LTE-Advanced, LTE-Advanced Pro, NR, and later communication systems. However, the present disclosure uses universal terms. When applying to specific systems, the terms may be replaced with terms used in the corresponding systems.

3GPP: 3rd Generation Partnership Project
LTE: Long Term Evolution
NR: New Radio, New Wireless, New Air Interface
PDCCH: Physical Downlink Control Channel
DCI: Downlink Control Information
PDSCH: Physical Downlink Shared Channel
UE: User Equipment
eNB: evolved NodeB
gNB: NR Base Station
TTI: Transmission Time Interval
C-RNTI: Cell Radio Network Temporary Identifier
CSI: Channel State Indicator
HARQ: Hybrid Automatic Repeat Request
CSI-RS: CSI-Reference Signal
CRS: Cell Reference Signal
PUCCH: Physical Uplink Control Channel
PUSCH: Physical Uplink Shared Channel
UL-SCH: Uplink Shared Channel
Sidelink: Sidelink
SCI: Sidelink Control Information
PSCCH: Physical Sidelink Control Channel
MCS: Modulation and Coding Scheme
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel In the present LTE V2X direct communications, only broadcast communication is supported. Broadcast is widely used in scenarios such as base stations transmitting system messages to UEs in a cell in cellular communications. Unicast refers to the communications between a transmitting user equipment (UE) and a single receiving user equipment. Multicast generally represents a group of UEs that are assigned the same ID, and the UEs communicate within the group. In LTE and NR communications, a base station and UE level communications use a form of unicast. Using the downlink data communication as an example, the data channel PDSCH uses the UE specific C-RNTI to perform scrambling, and thereby, realize unicast communication at the physical layer. It is noted that, in order to better reflect the quality of the downlink channel and improve transmission reliability, unicast communications usually includes CSI reporting and HARQ retransmission mechanisms. Release 14/15 LTE V2X project currently only supports broadcast communications between UEs, that is, control information and data sent by one UE can be received by other multiple UEs and decoded correctly. For NR V2X, in order to enable unicast communications, as described above, the CSI reporting mechanism and HARQ retransmission mechanism in V2X need to be specifically designed.

Wireless channel conditions are constantly changing. In LTE and NR communications, in order to better adapt to changes in wireless channels, the UE can report downlink channel quality information to the base station via CSI, so that the base station can select more reliable MCS for the UE, and more accurate time-frequency resources. CSI represents channel state information, and is composed of CQI, PMI, and RI. The present disclosure does not specifically limit the contents included in the CSI, and uses CSI reporting as a common representation. In NR, the base station configures CSI-RS resources at the UE level via RRC signaling. The base station dynamically triggers whether the UE reports non-periodic CSI in the uplink scheduling grant sent to the UE. The UE acquires CSI information by measuring the received downlink reference signal (CRS in LTE and CSI-RS in NR), and reports the CSI to the base station based on the resources indicated by the base station. For periodic CSI reporting, the base station configures PUCCH resources for the UE for CSI reporting; for non-periodic CSI reporting, the base station instructs the UE to use the PUSCH resources for reporting CSI. Specifically, in 5G NR non-periodic CSI reporting, the base station indicates the non-periodic CSI reporting type triggered by the UE via the CSI request field in the uplink scheduling grant, and instructs the UE the available resources for reporting CSI via a beta offset indicator field and a UL-SCH indicator field. The base station takes into consideration the channel quality reported by the UE when performing downlink scheduling. HARQ represents hybrid automatic retransmission, which can provide error correction function and realize rapid retransmission. This is widely used in wireless data communications, which will not be repeated here.

The direct communications process of the present Release 14 and LTE V2X is disclosed as follows. FIG. 1 shows the basic process of LTE V2X direct communications. UE1 transmits control information (SCI format 1) to UE2, which is carried by the physical layer channel PSCCH. SCI format 1 includes scheduling information for PSSCH, for example, time domain and frequency domain resources, MCS, etc. Wherein, the PSSCH carries data (sidelink data) transmitted by UE1 to UE2 in FIG. 1.

1) The PSCCH occupies one subframe in the time domain and two consecutive PRBs in the frequency domain. The initialization process of the scrambling sequence uses a predetermined value 510. The PSCCH may carry SCI format 1, including at least PSSCH time-frequency domain resource information, such as the frequency domain resource indicator field, indicating the starting sub-channel number and the number of consecutive sub-channels corresponding to the PSSCH of the PSCCH.

2) The PSSCH also occupies one subframe in the time domain, and is in the same subframe as the corresponding PSCCH frequency division multiplexing (FDM). The PSSCH is in the form of a sub-channel in the frequency domain. The sub-channel is $n_{subCHsize}$ consecutive PRBs in the frequency domain. The $n_{subCHsize}$ is configured by RRC parameters. The number of sub-channels is indicated by the frequency domain resource indicator field of SCI format 1.

Figure 2:
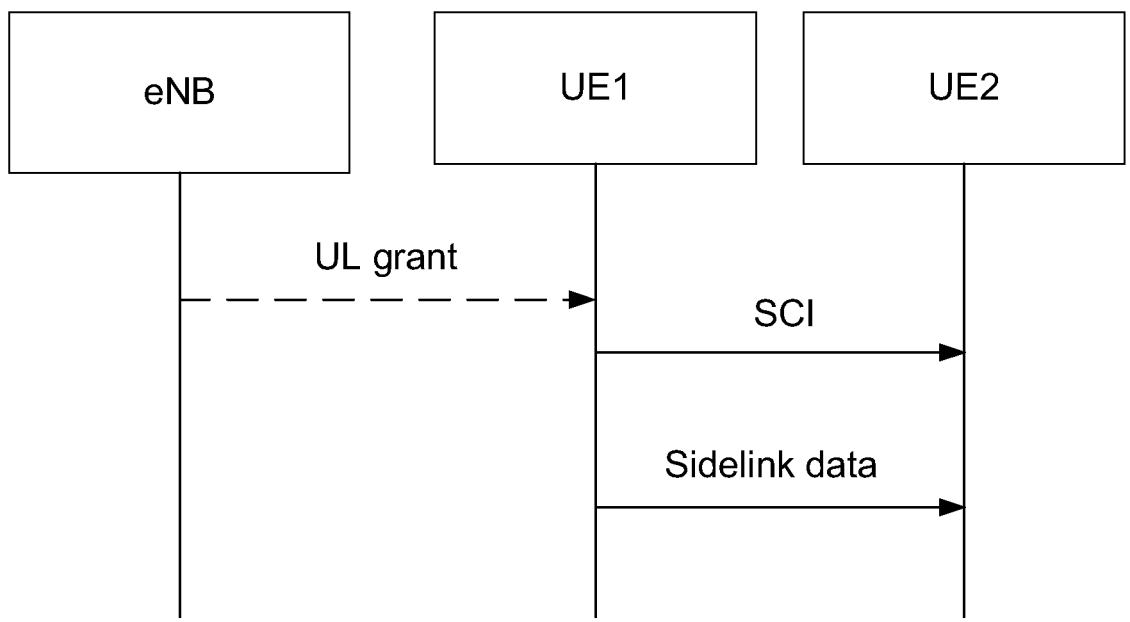
FIG. 2 is a diagram schematically illustrating a resource allocation scheme of LTE V2X in the present 3GPP standard specification.

The resource allocation schemes of the direct communications process of the present Release 14 and LTE V2X is disclosed as follows. FIG. 2 shows two resource allocation schemes of LTE V2X, which are respectively called resource allocation based on base station scheduling (Transmission mode 3) and resource allocation based on UE sensing (Transmission mode 4). In LTE V2X, when eNB network coverage exists, the base station can configure the resource allocation schemes of the UE, or referred to as the transmission mode of the UE, via the UE level RRC signaling SL-V2X-ConfigDedicated.

1. Resource allocation based on base station scheduling: When scheduled-r14 is configured in RRC signaling SL-V2X-ConfigDedicated, it represents that the UE is configured as a transmission mode based on base station scheduling. The base station configures SL-V-RNTI via RRC, and transmits an uplink scheduling grant (UL grant) to the UE via PDCCH (DCI format 5A). The uplink scheduling grant includes at least information such as a frequency domain resource indication of the PSSCH. After the UE successfully monitors the PDCCH scrambled by the SL-V-RNTI, the UE uses the PSSCH frequency domain resource indication field in the uplink scheduling grant as the frequency domain resource scheduling information of the PSSCH in the SCI format 1.

2. Resource allocation based on UE sensing: When ue-Selected-r14 is configured in RRC signaling SL-V2X-ConfigDedicated, it represents that the UE is configured as a transmission mode based on UE sensing. In the above-disclosed transmission mode, the base station configures an available transmission resource pool, and the UE determines the transmission resources of the PSCCH and PSSCH in the transmission resource pool according to predetermined rules (such as RSRP, etc.), and transmits the PSCCH and PSSCH according to the process shown in FIG. 1. The present disclosure will not repeat the rules for determining available resources by the UE.

Unless otherwise specified, in all examples and implementations of the present disclosure:

In the situation of unicast, multicast or broadcast, the transmitting UE refers to the UE that transmits the PSCCH and PSSCH, and the receiving UE represents the UE that receives the PSCCH and PSSCH.

All implementations in the present disclosure are equally applicable to HARQ feedback, that is, the CSI reporting disclosed in all implementations also includes the specific implementation of HARQ feedback.

Implementation 1

Figure 3A:
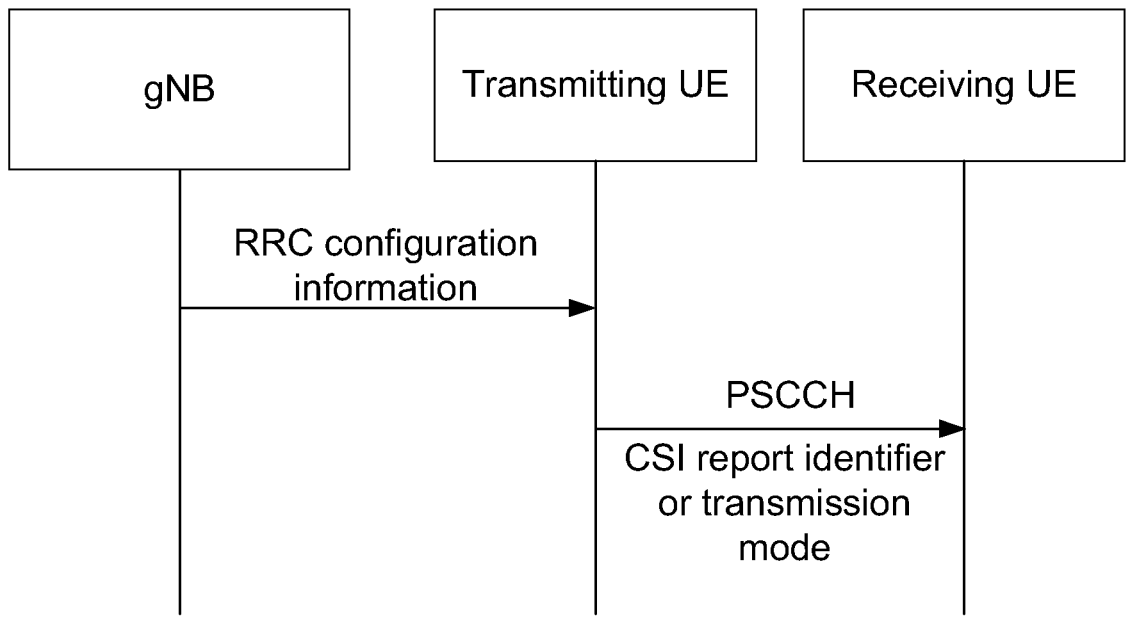
FIG. 3A is a diagram schematically illustrating a basic process of a method executed by a transmitting user equipment according to Implementation 1 of the present disclosure.

FIG. 3A is a diagram schematically illustrating a basic process of a method executed by a transmitting user equipment according to Implementation 1 of the present disclosure.

Figure 3B:
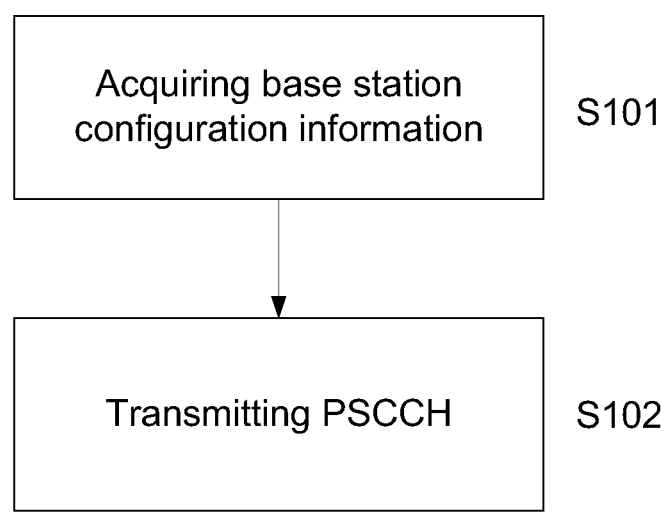
FIG. 3B is a flowchart schematically illustrating a method executed by a transmitting user equipment according to Implementation 1 of the present disclosure.

FIG. 3B is a flowchart schematically illustrating a method executed by a transmitting user equipment according to Implementation 1 of the present disclosure.

Hereinafter, the method executed by the transmitting user equipment according to the Implementation 1 of the present disclosure will be described in detail with reference to FIGS. 3A and 3B.

As shown in FIG. 3B in combination with FIG. 3A, in the Implementation 1 of the present disclosure, the steps executed by the transmitting user equipment include:

At Step S101, the transmitting user equipment acquires the configuration information of the base station. Optionally, the configuration information of the base station may be transmitted via high level RRC signaling. The configuration information includes a transmission mode configuration of the transmitting user equipment, and/or an indication of a CSI-RS measurement resource set, and/or an identifier of the CSI report.

At Step S102, the transmitting user equipment transmits a PSCCH according to the configuration information of the base station. Wherein, the PSCCH carries control information. The control information may include an identifier of the CSI report or an indication of a transmission mode of the transmitting user equipment, and/or an indication of a CSI report trigger, and/or an indication of a specific CSI report resource, and/or an indication of a specific CSI-RS measurement resource.

Optionally, at Step S101 of Implementation 1, the transmission mode configuration of the transmitting user equipment may include a transmission mode based on base station scheduling, or a transmission mode based on UE sensing, or a transmission mode based on base station assisted scheduling, or a transmission mode based on UE assisted scheduling. The transmission mode based on the base station assisted scheduling may represent that the base station instructs partial transmission parameters of the transmitting user equipment, such as MCS. Other transmission parameters are determined based on sensing of the transmitting user equipment. The transmission mode based on UE assisted scheduling may represent that a transmission mode of a group leader user equipment transmits direct communication scheduling information to group member user equipment in multicast direct communications.

Optionally, at Step S101 of Implementation 1, the CSI-RS measurement resource configured by the base station may be a CSI-RS, or an SRS, or a DMRS of the transmitting user equipment.

Optionally, at Step S102 of Implementation 1, the indication of the CSI report trigger may be an indication of whether to report the CSI or the type of the CSI report.

Optionally, at Step S102 of Implementation 1, the indication of the specific CSI-RS measurement resource may be a CSI-RS, or SRS, or DMRS resource ID, or a specific time-frequency domain indication of the measurement resource transmitted by the transmitting user equipment.

Optionally, at Step S101 and Step S102 of Implementation 1, one implementation of the CSI report identifier is a 1-bit indication field, wherein 0 represents reporting to the base station, and 1 represents reporting to the transmitting user equipment, or vice versa. The identifier of CSI report at Step S101 may also be an indication of whether to enable reporting of CSI to the base station or the transmitting user equipment. The indication of the transmission mode of the transmitting user equipment represents that the specific transmission mode of the transmitting user equipment may be a transmission mode based on base station scheduling, a transmission mode based on UE sensing, or a transmission mode based on base station or UE assisted scheduling. Optionally, the CSI report identifier or transmission mode may generate an implicit indication via PSCCH CRC scrambling or a PSCCH scrambling initialization sequence. The present implementation is not specifically limited to this.

Optionally, at Step S102 of Implementation 1, the specific CSI report resource indication field may indicate a PUCCH resource or a PUSCH resource, and may also indicate a resource of a PSCCH, or a sidelink feedback channel, or a PSSCH.

Optionally, at Step S102 of Implementation 1, the transmitting user equipment may also transmit a PSDCH or a PSBCH. Wherein, the PSDCH or PSBCH may include an identifier of CSI report or an indication of a transmission mode for the transmitting user equipment. Alternatively, when the transmitting user equipment and the receiving user equipment establish a unicast or multicast connection, the transmitting user equipment indicates the identifier of a CSI report via the higher layer signaling or the transmission mode of the transmitting user equipment.

Implementation 2

Figure 4A:
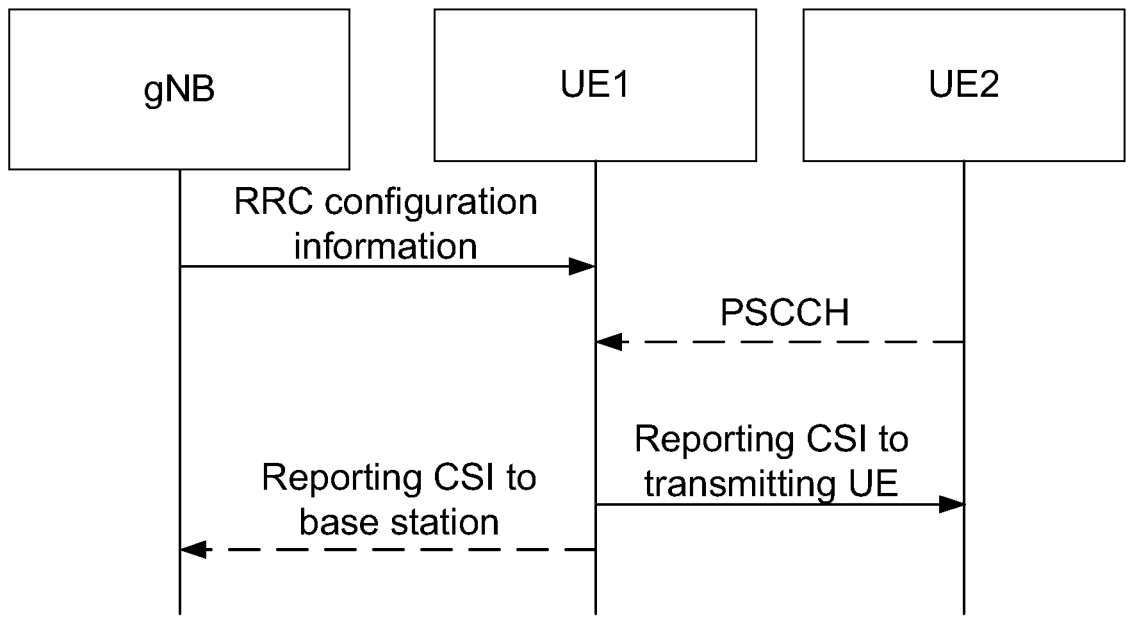
FIG. 4A is a diagram schematically illustrating a basic process of a method executed by a receiving user equipment according to Implementation 2 of the present disclosure.

FIG. 4A is a diagram schematically illustrating a basic process of a method executed by a receiving user equipment according to Implementation 2 of the present disclosure.

Figure 4B:
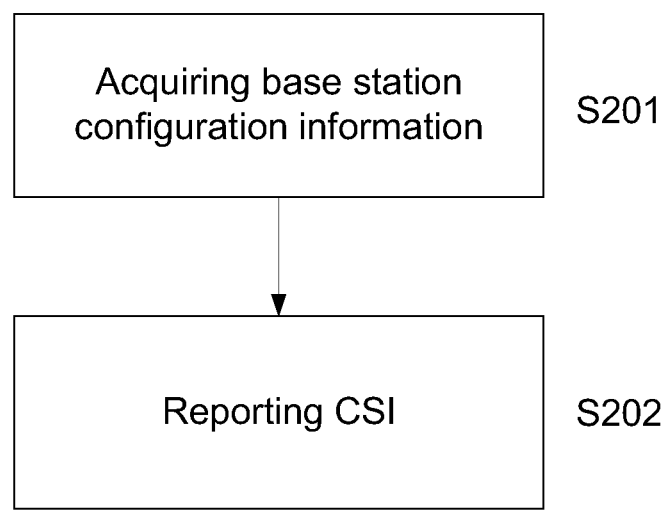
FIG. 4B is a flowchart schematically illustrating a method executed by a receiving user equipment according to Implementation 2 of the present disclosure.

FIG. 4B is a flowchart schematically illustrating a method executed by a receiving user equipment according to Implementation 2 of the present disclosure.

Hereinafter, the method executed by the receiving user equipment according to the Implementation 2 of the present disclosure will be described in detail with reference to FIGS. 4A and 4B.

As shown in FIG. 4B in combination with FIG. 4A, in the Implementation 2 of the present disclosure, the steps executed by the receiving user equipment include:

At Step S201, the receiving user equipment acquires the CSI measurement configuration information of the base station. Optionally, the base station may configure the CSI measurement information via high level RRC signaling. The CSI measurement configuration information may include a list of CSI report identifiers and/or a resource set of CSI report. The CSI report identifier list may be a set, including one or more CSI report identifiers of sidelink connections.

At Step S202, if the CSI report identifier indicates reporting to the base station, the receiving user equipment uses the CSI report resource indicated by the base station for CSI reporting. Optionally, the CSI report resource indicated in the PSCCH transmitted by the transmitting user equipment may be used for CSI reporting. If the CSI report identifier indicates reporting to the transmitting user equipment, the receiving user equipment uses the CSI report resources indicated in the PSCCH transmitted by the transmitting user equipment for CSI reporting. Optionally, the CSI report resource indicated by the base station may be used for CSI reporting.

Optionally, at Step S201, another possible implementation of the CSI report identifier is the transmission mode of the transmitting user equipment. Alternatively, if the base station is configured with the CSI resource for reporting to the base station, it represents reporting to the base station. If the base station in not configured with the CSI resource for reporting to the base station, it represents reporting to the transmitting user equipment.

Optionally, at Step S201, the receiving user equipment may acquire the CSI indication information via the PSCCH transmitted by the transmitting user equipment. The CSI indication information may include a CSI report identifier or a transmission mode of the transmitting user equipment, and/or a CSI report resource.

Optionally, at Step S202, the CSI report resource configured by the base station may be a PUCCH resource or a PUSCH resource, or may be a PSCCH resource or a PSSCH resource or a resource of a sidelink feedback channel. The CSI reported by the receiving user equipment may include the ID of the receiving and/or transmitting user equipment, and/or the ID of the direct communication connection of the receiving and transmitting user equipment.

An optional variation of Implementation 2 may also include that when the receiving user equipment is in an RRC Idle or Inactive state, if the base station instructs or the CSI report identifier instructs the transmitting user equipment to report to the base station, the receiving user equipment may enter an RRC connected state, for example, initiating random access. Optionally, when the transmitting user equipment triggers CSI reporting, the receiving user equipment always reports the CSI to the transmitting user equipment.

Implementation 3

Figure 5A:
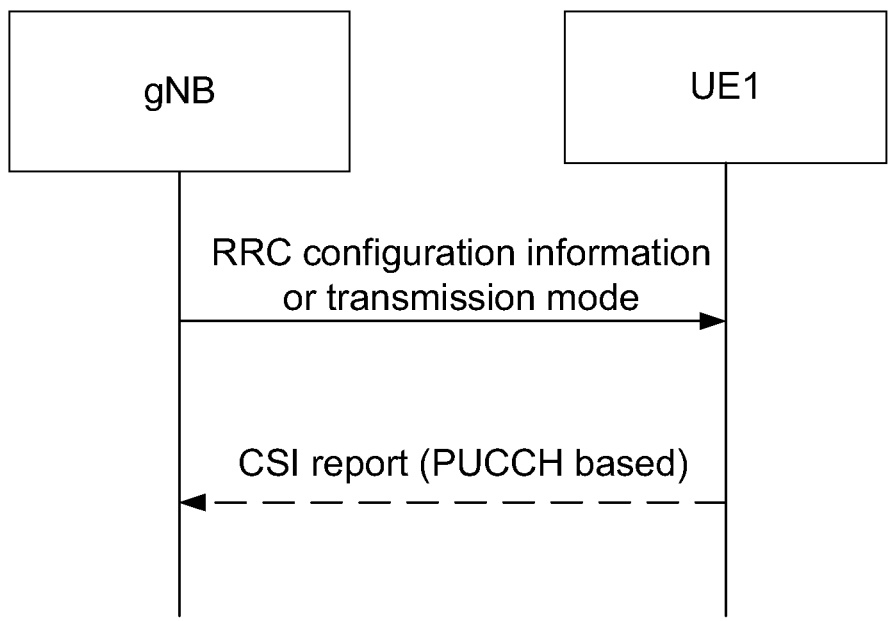
FIG. 5A is a diagram schematically illustrating a basic process of a method executed by a transmitting user equipment according to Implementation 3 of the present disclosure.

FIG. 5A is a diagram schematically illustrating a basic process of a method executed by a transmitting user equipment according to Implementation 3 of the present disclosure.

Figure 5B:
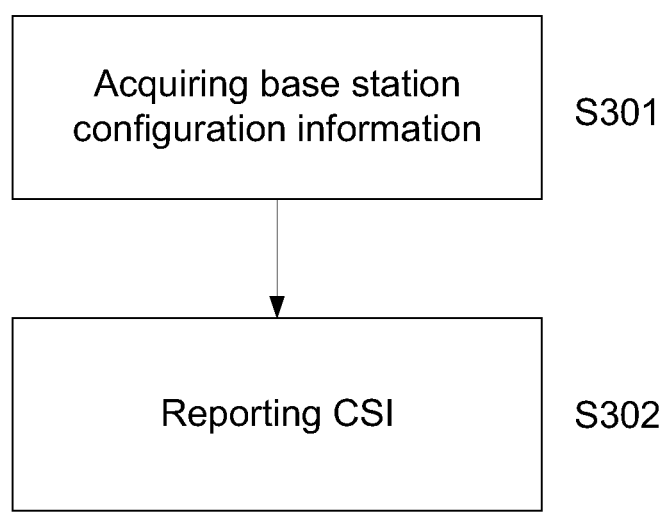
FIG. 5B is a flowchart schematically illustrating a method executed by a transmitting user equipment according to Implementation 3 of the present disclosure.

FIG. 5B is a flowchart schematically illustrating a method executed by a transmitting user equipment according to Implementation 3 of the present disclosure.

Hereinafter, the method executed by the transmitting user equipment according to the Implementation 3 of the present disclosure will be described in detail with reference to FIGS. 5A and 5B.

As shown in FIG. 5B in combination with FIG. 5A, in the Implementation 3 of the present disclosure, the steps executed by the transmitting user equipment include:

At Step S301, the transmitting user equipment acquires configuration information of the base station. Optionally, the base station may transmit the configuration information via high level RRC signaling. The configuration information includes an indication of whether to report the received CSI report.

At Step S302, if the base station instructs the transmitting user equipment to report the received CSI report to the base station, the transmitting user equipment uses the resource indicated by the base station to report the CSI to the base station. Optionally, the resource indicated by the base station may be a PUCCH resource or a PUSCH resource.

Optionally, at Step S301 of Implementation 3, an implementation is that the configuration information includes a 1-bit field, wherein, 1 represents that the reporting of the received CSI report is enabled; 0 in the configuration information represents that the reporting of the received CSI report is disabled, or vice versa.

Optionally, at Step S302 of Implementation 3, the CSI reported by the transmitting user equipment to the base station may include the ID of the receiving user equipment, and/or the ID of the direct communication connection between the transmitting user equipment and the receiving user equipment.

Optionally, in another implementation of Implementation 3, if the base station configures the transmission mode of the transmitting user equipment to be a transmission mode based on base station scheduling, or a transmission mode based on base station assisted scheduling, the transmitting user equipment reports the received CSI report using the resource indicated by the base station. Wherein, the CSI report reported by the transmitting user equipment may include the ID of the receiving user equipment, and/or the ID of the direct communication connection between the transmitting user equipment and the receiving user equipment. The base station transmits an uplink scheduling grant to the transmitting user equipment, wherein the uplink scheduling grant includes an indication of CSI report trigger or an indication of CSI report type, and then the transmitting user equipment reports CSI to the base station.

Additionally, it is noted that, the dotted lines in the above-disclosed FIGS. 2, 3A, 4A, and 5A represent that the processes may be executed according to specific conditions.

As such, according to the above-disclosed implementations, the present disclosure provides a method that may be executed by a user equipment based on V2X of 5G NR network technology.

Variation

Figure 6:
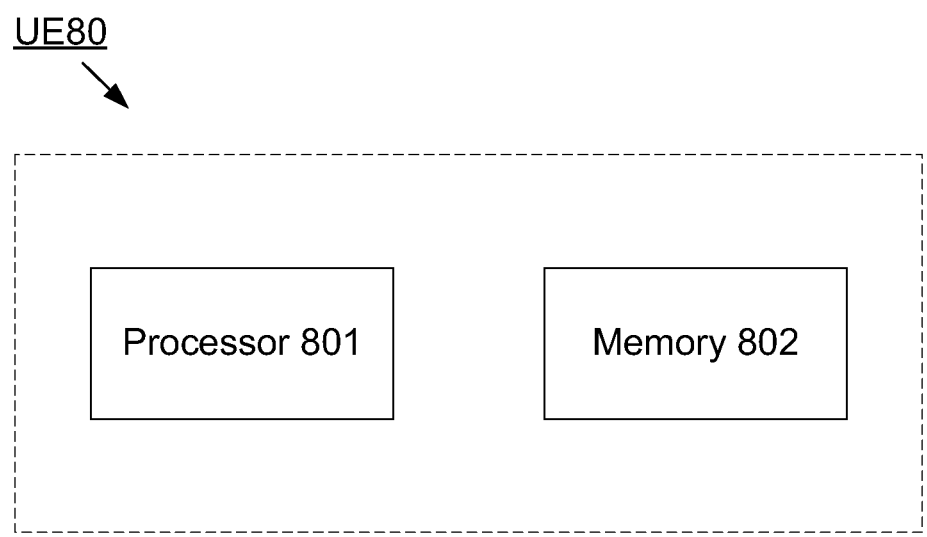
FIG. 6 is a block diagram schematically illustrating a user equipment according to the present disclosure.

In the following, FIG. 6 is used to explain a variation of the user equipment that may execute the above-disclosed method executed by the user equipment described in detail of the present disclosure.

FIG. 6 is a block diagram schematically illustrating a user equipment according to the present disclosure.

As shown in FIG. 6, the user equipment 80 comprises a processor 810 and a memory 820. The processor 810, in one example, may comprise a microprocessor, a microcontroller, an embedded processor etc. The memory 820, in one example, may comprise volatile memory (e.g., random access memory (RAM)), a hard disk drive (HDD), non-volatile memory (e.g., flash memory), or any other memories. The memory 820 stores program instructions. The program instructions, when executed by the processor 810, cause the base station to carry out the access control methods as disclosed herein.

The method of the present disclosure and the related equipment have been described above with reference to the preferred implementations. Persons skilled in the art can understand that the methods disclosed above are only exemplary, and the implementations disclosed above may be combined with each other without conflicts. The methods of the present disclosure are not limited to the steps and sequences disclosed above. The network node and user equipment disclosed above may include further modules, for example, may also include modules that can be developed or developed in the future for the use of base stations, Mobility Management Entities (MMEs), or UEs, etc. The various identifiers disclosed above are exemplary only and not limiting. The present disclosure is not limited to the specific cells as examples of the identifiers. Persons skilled in the art may make further variations and modifications based on the teachings of the disclosed implementations.

It should be understood that the above-disclosed implementations of the present disclosure may be implemented by software, hardware, or a combination of both software and hardware. For example, the various components inside the base station and user equipment in the above implementations can be implemented by a variety of devices, including but not limited to analog circuit devices, digital circuit devices, digital signal processing (DSP) circuits, and programmable processing devices, application-specific integrated circuits (ASICs), field-programmable gate arrays (FPGAs), programmable logic devices (CPLDs) etc.

In the present disclosure, a "base station" may refer to a mobile communications data and control switching center with larger transmission power and wider coverage area, and may include functions such as resource allocation scheduling, data receiving and transmitting. A "user equipment" may refer to a user mobile terminal, for example, a terminal device that includes a mobile phone, a notebook/laptop computer, and the like that may execute wireless communications with a base station or a micro base station.

Furthermore, the implementations of the present disclosure disclosed herein may be implemented on a computer program product. More specifically, the computer program product may be one of the following product: a computer-readable medium, having computer program logic encoded on the computer-readable medium. When executed on a computing device, the computer program logic provides related operations to realize the above technical schemes of the present disclosure. When executed on at least one processor of a computing system, the computer program logic causes the processor to execute the operations (methods) disclosed in the implementations of the present disclosure. The arrangement of the present disclosure is typically provided as software, code, and/or other data structures provided or encoded on a computer-readable medium such as an optical medium (e.g., a CD-ROM), a floppy disk, or a hard disk, or other media of firmware or microcode on one or more ROM or RAM or PROM chip, or downloadable software images, shared databases of one or more modules. Software or firmware or such arrangements may be installed on a computing device, so that one or more processors in the computing device execute the technical schemes disclosed in the implementations of the present disclosure.

Furthermore, each functional module or individual feature of the base station equipment and terminal equipment used in each of the above implementations may be realized or executed by a circuit, which is usually one or more integrated circuits. Circuits designed to execute the functions described in the present disclosure may include general-purpose processors, digital signal processors (DSPs), application-specific integrated circuits (ASICs) or general-purpose integrated circuits, field-programmable gate arrays (FPGAs), or other programming logic devices, discrete gate or transistor logic, or discrete hardware components, or any combination of the above. A general purpose processor may be a microprocessor, or the processor may be an existing processor, controller, microcontroller, or state machine. The above-disclosed general purpose processor or each circuit may be configured by a digital circuit, or may be configured by a logic circuit. Furthermore, due to advances in semiconductor technology, when advanced technologies to replace current integrated circuits exist, the present disclosure may also use integrated circuits obtained using the advanced technologies.

Although the present disclosure has been shown above in connection with the preferred implementations of the present disclosure, persons skilled in the art will understand that various modifications, substitutions and changes may be made to the present disclosure without departing from the spirit and scope of the present disclosure. Therefore, the present disclosure should not be defined by the disclosed implementations, but should be defined by the appended claims and the equivalents.

What is claimed is:

1. A method performed by a sidelink transmitting user equipment (SL TX UE) for sidelink (SL) vehicle to everything (V2X) unicast transmission to a sidelink receiving user equipment (SL RX UE), the method comprising:
   receiving, from a base station, a Radio Resource Control (RRC) configuration including information for enabling SL Channel State Information (CSI) reporting, first Modulation and Coding Scheme (MCS) information for a first SL transmission by the SL TX UE, and a CSI-Reference Signal (CSI-RS) measurement resource configuration;
   transmitting, to the SL RX UE, the CSI-RS measurement resource configuration for deriving an SL CSI report;
   transmitting, to the SL RX UE, in sidelink control information (SCI), an aperiodic CSI report trigger for triggering the SL CSI report, the SCI including second MCS information for a second SL transmission associated with the SCI, the second SL transmission including a CSI-RS resource based on the CSI-RS measurement resource configuration; and
   receiving, from the SL RX UE, the SL CSI report in a Physical Sidelink Shared Channel (PSSCH), wherein:
   the SL TX UE is associated with a first identifier (ID),
   the SL RX UE is associated with a second ID, and
   the SL CSI report identifies an associated SL connection based on the first ID and the second ID carried in the PSSCH.

2. A method performed by a sidelink receiving user equipment (SL RX UE) for sidelink (SL) vehicle to everything (V2X) unicast transmission to a sidelink transmitting user equipment (SL TX UE), the method comprising:
   receiving, from a base station, a Radio Resource Control (RRC) configuration including first Modulation and Coding Scheme (MCS) information for a first SL transmission by the SL RX UE;
   receiving, from the SL TX UE, a Channel State Information-Reference Signal (CSI-RS) measurement resource configuration for deriving an SL CSI report, the CSI-RS measurement resource configuration being received from the base station by the SL TX UE before the SL RX UE receives the CSI-RS measurement resource configuration from the SL TX UE;
   receiving, from the SL TX UE, in sidelink control information (SCI), an aperiodic CSI report trigger for triggering the SL CSI report, the SCI including second MCS information for a second SL transmission associated with the SCI, the second SL transmission including a CSI-RS resource based on the CSI-RS measurement resource configuration; and
   transmitting, to the SL TX UE, the SL CSI report in a Physical Sidelink Shared Channel (PSSCH), wherein:
   the SL TX UE is associated with a first identifier (ID),
   the SL RX UE is associated with a second ID, and
   the SL CSI report identifies an associated SL connection based on the first ID and the second ID carried in the PSSCH.

3. A sidelink transmitting user equipment (SL TX UE) for sidelink (SL) vehicle to everything (V2X) unicast transmission to a sidelink receiving user equipment (SL RX UE), the SL TX UE comprising:
   a processor; and
   a memory storing instructions, wherein
   the processor is configured to execute the instructions to:
   receive, from a base station, a Radio Resource Control (RRC) configuration including information for enabling SL Channel State Information (CSI) reporting, first Modulation and Coding Scheme (MCS) information for a first SL transmission by the SL TX UE, and a CSI-Reference Signal (CSI-RS) measurement resource configuration;
   transmit, to the SL RX UE, the CSI-RS measurement resource configuration for deriving an SL CSI report;
   transmit, to the SL RX UE, in sidelink control information (SCI), an aperiodic CSI report trigger for triggering the SL CSI report, the SCI including second MCS information for a second SL transmission associated with the SCI, the second SL transmission including a CSI-RS resource based on the CSI-RS measurement resource configuration; and
   receive, from the SL RX UE, the SL CSI report in a Physical Sidelink Shared Channel (PSSCH), wherein:
   the SL TX UE is associated with a first identifier (ID),
   the SL RX UE is associated with a second ID, and
   the SL CSI report identifies an associated SL connection based on the first ID and the second ID carried in the PSSCH.

* * * * *